United States Patent Office 3,391,191
Patented July 2, 1968

3,391,191
LIQUID PHASE DECARBOXYLATION OF
FATTY ACIDS TO KETONES
Hermann Velde, Essen, Germany, assignor to
Th. Goldschmidt A.G., Essen, Germany
No Drawing. Filed Dec. 26, 1963, Ser. No. 333,626
Claims priority, application Germany, Jan. 5, 1963,
G 36,789
6 Claims. (Cl. 260—595)

ABSTRACT OF THE DISCLOSURE

A $C_{18}$ alkenoic carboxylic acid in liquid state is heated in the presence of magnesium oxide, whereby the magnesium soap of the acid is formed. The heating is then continued under reduced pressure to a temperature of between about 300 to 325° C. The ratio of unsaturated carboxylic acid to magnesium oxide should be about 100:15 to 100:30. The application teaches that the reaction is completed within about 10 to 30 minutes.

The ketone formed in the process may be removed from the reaction mixture by selective extraction, for example with a keto-group containing solvent such as acetone.

---

This invention generally relates to ketones and is particularly directed to an improved process for preparing ketones from $C_{18}$ alkenoic carboxylic acids by heating the acids to temperatures in excess of 300° C. in the presence of magnesium oxide.

The feasibility of converting fatty acids into ketones at high temperatures is well known by those skilled in the art of ketone formation. It has thus previously been suggested to effect the ketonization of fatty acids in vapor-phase or in liquid condition.

In the ketonization of fatty acids in the vapor phase, the customary procedure is to conduct the fatty acid vapors over and past stationarily arranged catalysts. Manganese oxide-aluminum oxide have been proposed as suitable catalysts for this purpose. It is well known that, due to the high boiling points of the fatty acids, the ketonization has to be carried out at relatively high temperatures. Thus temperatures in excess of 400° C. are usually adopted. These high reaction temperatures are also necessary for the purpose of obtaining satisfactory yields, since the contact period between the fatty acid vapor and the catalyst is relatively short. The prior art mode of operation hereinabove described invariably results in a reaction product which essentially is a mixture of ketone and unchanged fatty acid. However, the reaction product ordinarily also contains appreciable amounts of thermal decomposition products of the fatty acid and the ketones. Furthermore, the procedure referred to cannot be adopted for the ketonization of unsaturated carboxylic or fatty acids since, owing to the high temperatures which have to be employed, the amount of decomposition and polymerization product in the final reaction product would be impermissibly high. This is so because decomposition and polymerization increases with the unsaturation of the respective acid.

Ketonization in liquid phase is customarily carried out by heating the salts of the fatty acids or by heating molten fatty acids in the presence of a salt-forming catalyst. Such liquid-phase ketonization is usually carried out at temperatures of about 300 to 350° C. The required reaction time amounts in most instances to about between 7 to 10 hours.

Ketonizations in liquid phase have previously been carried out according to one of the following two processes:

According to the first process, as developed by P. Mastagli et al. (Compt. Rend. 248 (1959) 1830), anhydrous manganese soaps are heated at reduced pressure to temperatures of about 340 to 350° C. As in all other known ketonization processes in the liquid phase, the reaction proceeds under violent frothing. This makes it necessary to use large reaction vessels and, moreover, the entire process has to be very carefully performed and the reaction has to be constantly watched and observed. Another disadvantage of this known procedure is the requirement first to produce the manganese soaps by a double reaction which soaps can be filtered with difficulty only, and which have to be dried before use. Moreover, the employment of a manganese soap in the ketonization of fatty acids yields products of yellow or greenish hue which requires subsequent purification operations.

According to the second prior art liquid phase procedure, as developed by Curtis et al. (J.S.C.I., 66 (1947) 402 ff., 'The Ketonization of Higher Fatty Acids"), the ketonization is carried out at atmospheric pressure and temperatures of up to 330 to 340° C. in the presence of magnesium oxide or magnesium carbonate. The reaction time amounts, according to this publication, to about 10 hours. Due to this relatively long reaction period, unsaturated carboxylic or fatty acids cannot be transformed into the corresponding ketones by this procedure. If such conversion were at all possible, the ketone would be obtained in insignificant yields only, which would not be interesting from a commercial point of view. Again, as expressly pointed out by the authors of the publication referred to, the reaction proceeds under violent frothing. With a view to preventing the drawbacks caused by frothing, it has been suggested to carry out the conversion with at the most 50% of the stoichiometric amount of magnesium oxide, calculated on the fatty acid. This proposal, however, is certainly not satisfactory, since, according to the following diagrammatical reaction course, the formation of the magnesium salt of the ketocarboxylic acid is that reaction stage which determines the reaction speed, this reaction being catalytically influenced by the magnesium oxide.

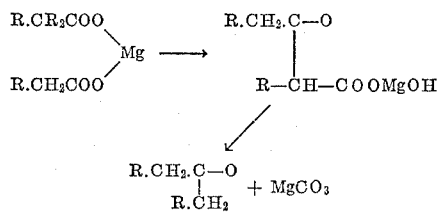

It is accordingly a primary object of this invention to overcome the drawbacks of the prior art ketonization procedure referred to by providing a process for the ketonization of $C_{18}$ alkenoic carboxylic acids which results in high yields while substantially preventing frothing.

Another object of the present invention is to provide a process for the ketonization of $C_{18}$ alkenoic fatty acids which is carried out in a relatively short period of time and which results in high yields of valuable ketones.

Generally, it is an object of this invention to improve on the art of ketone formation from $C_{18}$ alkenoic carboxylic or fatty acids as presently practised.

For the purpose of this application, including the appended claims, the term "$C_{18}$ alkenoic fatty acid" or "$C_{18}$ alkenoic carboxylic acid" refers to such acids having one or several unsaturated bonds.

Briefly, and in accordance with this invention, the ketonization of $C_{18}$ alkenoic fatty acids is carried out by reacting the respective fatty acid at a temperature of above 300° C. with magnesium oxide in a weight ratio of about from 100:15 to 100:30 at a reduced pressure, whereafter the ketone which is formed thereby is separated from the reaction mixture in any suitable manner known per se.

The crux of the invention as compared with the prior art is therefore that the ketonization is carried out in the presence of relatively large quantities of magnesium oxide but, at the same time, at reduced pressure.

Experience has established that particularly favorable results are obtained if the ketonization is carried out in a temperature range of about 300 to 325° C. Further, it has been found to be very advantageous to operate at a pressure of less than 30 mm. Hg, preferably 3 to 15 mm. Hg.

In order to prevent loss of fatty acid prior to the ketonization reaction proper, it is recommended to reduce the pressure only after a temperature of about 270° C. has been reached.

It is most surprising and unexpected that, contrary to the statements as contained in the publications referred to, frothing is prevented by increasing the magnesium oxide content. The increase in the magnesium oxide content in accordance with this invention drastically reduces the reaction period necessary for carrying out the ketonization. Generally, it has been established that in accordance with the inventive procedure, the conversion is completed within 10 to 30 minutes, while according to the prior art processes, many hours were required. Due to this rapid reaction, it is now possible to subject unsaturated fatty acids to ketonization with high yields. Thus, the invention may successfully be carried out with, for example, oleic acid, linoleic acid, soya oil fatty acid, and other $C_{18}$ alkenoic fatty acids of drying or semi-drying nature.

It is feasible to remove the ketones from the reaction mixture by distillation directly upon their formation and while the reaction still proceeds. However, it is also possible to delay the separation of the ketones from the catalyst until after the reaction has been completed. This separation again may be performed by distillation. In many instances, particularly in the ketonization of strongly unsaturated fatty acids, it is advantageous to separate the ketones from the reaction mixture by extraction, after the reaction mixture has cooled down. Keto-group containing solvents are particularly suitable as extracting agents. Thus, for example, acetone is an excellent extracting agent for extracting the formed ketones from the reaction mixture. Of course, it is also feasible to separate the catalyst by filtration of the reaction mixture at high temperatures, in which event it has been established to be advantageous to add a solvent to the reaction mixture prior to the filtration proper. Agents which assist and induce filtration may also be added.

If the entire amount of magnesium oxide is added to the reaction mixture at one time, it has been observed in connection with a number of fatty acids that the liquid phase becomes extremely viscous in the course of the primary soap formation at temperatures of about 100° C. High viscosity of the liquid phase, of course, renders stirring of the reaction mixture difficult, and this in turn, may lead to local overheating. With a view to preventing this phenomenon in a simple manner, the addition of the magnesium oxide is performed in several stages. Thus, for example, magnesium oxide is first added to the fatty acid at temperatures below 100° C., preferably at room temperature, at a ratio up to about 8:100. This addition again may be performed into several stages. Once a temperature of above 230° C. has been reached, additional amounts of magnesium oxide are then added to the reaction mixture in such quantities that the final ratio of about 100:15 to 100:30 is obtained.

Ketones which are prepared in accordance with the inventive procedure, may be used for many purposes. Thus, for example, they are suitable softeners or plasticizers for synthetic materials, as for example, polyvinyl-chloride. Further, the ketones are suitable additives for cosmetic preparations for skin softening purposes. Ketones which are formed in accordance with the inventive procedure are in many respects similar to the corresponding fatty acid glyceride. However, contrary to the glycerides, they are alkali resistant. Due to their oily consistency, the ketones also find use in the textile industry for a variety of purposes.

The invention will now be described by several examples, it being understood, however, that these examples are given by way of illustration, and not by way of limitation, and that many changes may be effected in the choice of, for example, raw materials, temperature ranges, quantities, etc., without departing in any way from the scope and spirit of the invention as recited in the appended claims.

EXAMPLE I

This experiment was carried out in a three-neck flask fitted with gas inlet, gas discharge and an agitator. The gas discharge was connected to a vacuum pump through a reflux cooler and several cooling traps. 100 parts by weight of technical grade, distilled linoleic acid and 20 parts by weight of technical grade magnesium oxide were well mixed in the flask. The fatty acid had the following characteristics:

Acid number _____ 198
Saponification number _____ 200
Iodine number _____ 179

Nitrogen was introduced through the gas inlet and the mixture was heated under agitation. After a temperature of 290° C. had been reached in the reaction mixture, the flask was slowly evacuated to a pressure of about 5 to 8 mm. Hg. A vigorous reaction under evolution of carbon dioxide set in at a temperature of 310° C. The liquid mass thus formed started to boil at the same time. Strong reflux was observed. The vigorous carbon dioxide evolution stopped after a reaction period of about 10 to 12 minutes. The heating was discontinued after a reaction period of about 20 minutes, whereafter the flask was cooled and rinsed with nitrogen. The reaction mixture was thereafter mixed with 250 parts by weight of acetone. The mixture thus obtained was heated for several minutes to boiling and was thereafter filtered. The filtration residue was once again extracted with 250 parts by weight of acetone and again filtered. The two acetone extracts were combined and the acetone was removed by distillation. 76 parts by weight of dilinoleicalkylketone corresponding to 85.5% of the theoretical amount, were obtained. The characteristics of the reaction product were as follows:

|  | Found | Calculated |
|---|---|---|
| Acid number | 1 | 0 |
| Saponification number | 4 | 0 |
| Iodine number | 193 | 201 |
| Carbonyl number | 53.5 | 56 |

EXAMPLE II

This experiment was carried out in the same equipment as described in Example I. 400 parts by weight of crude distilled linoleic fatty acid were heated with 80 parts by weight of magnesium oxide of fine particle size. The reaction flask was slowly evacuated to a vacuum value of about 5 to 8 mm. Hg upon reaching a temperature of about 280° C. The reaction mixture was then maintained at a temperature of about 320° C. for a period of 20 minutes. During this period, 145 parts by weight of liquid ketone were withdrawn from the reflux. The heating was discontinued upon completion of the reaction, the flask was cooled and the apparatus filled with nitrogen. The residue was still in liquid phase and could be stirred without difficulty. This residue was twice extracted with 850 parts by weight of acetone. This resulted in an additional recovery of 142 parts by weight of ketone.

The product obtained by distillation had the following characteristics:

Acid number _____ 0.1
Saponification number _____ 0.5
Iodine number _____ 194

The product obtained by extraction had the following characteristics:

Acid number _____ 0.7
Saponification number _____ 3.0
Iodine number _____ 198

The total yield was 287 parts by weight, corresponding to a theoretical amount of 80.7%.

EXAMPLE III

The experiment was carried out in the same apparatus as described in connection with Example I. 400 parts by weight of soyabean oil fatty acid were heated as in Example I with 80 parts by weight of magnesium oxide. The soyaboan oil fatty acid had the following characteristics:

Acid number _____ 204
Saponification number _____ 206
Iodine number _____ 125

Upon reaching a temperature of 300° C., the glass flask was evacuated to a vacuum of 5 mm. Hg and the reaction mixture was then heated for 20 minutes to a temperature of about 315° C. 185 parts by weight of ketone were withdrawn from the reflux cooler during the reaction. The cooled but still liquid flask residue was thereafter extracted three times each with 430 parts by weight of acetone. This resulted in an additional recovery of 130 parts by weight of ketone. Upon combining the individual fractions, 315 parts by weight of a ketone were obtained which corresponds to 89.2% of the theoretical amount.

The characteristics of the reaction product were as follows:

|  | Found | Calculated |
|---|---|---|
| Acid number | 0.4 | 0 |
| Saponification number | 2.3 | 0 |
| Iodine number | 140 | 142 |
| Carbonyl number | 53 | 58 |

EXAMPLE IV

The experiment was carried out with the same equipment as described in connection with Example I. 200 parts by weight of crude linoleic fatty acid were heated with 20 parts by weight of magnesium oxide. The characteristics of the acid were as follows:

Acid number _____ 186
Saponification number _____ 189
Iodine number _____ 157

An additional amount of 20 parts by weight of magnesium oxide were added to the reaction mixture after it had reached a temperature of about 240° C. The flask was evacuated to a pressure value of 5 to 6 mm. Hg at a temperature of 285° C. The reaction mixture was heated at this vacuum value for 20 minutes to a temperature of about 320° C. The liquid flask residue, upon cooling, was twice extracted with 430 parts by weight of acetone, and, after removal of the acetone by distillation, 148 parts by weight of ketone were obtained. This ketone had the following characteristics:

Acid number _____ 2.0
Saponification number _____ 4.5
Iodine number _____ 178

The total yield was 148 parts by weight corresponding to 82.7% of the theoretical amount.

EXAMPLE V 100 parts by weight of crude linoleic acid were, as in Example I, admixed with 15 parts by weight of magnesium oxide. The mixture was heated. The glass flask was evacuated to a vacuum value of 5 to 6 mm. Hg at a temperature of 295° C. The mixture was thereafter heated for 20 minutes to a temperature of 320° C. under reflux. Upon completion of the reaction, the flask was cooled and the reaction mixture was twice extracted with 250 parts by weight of acetone. After distillation of the acetone, 76 parts by weight of ketone were obtained. The characteristics of the ketone were as follows:

Acid number _____ 0.8
Saponification number _____ 2.5
Iodine number _____ 193

The total yield amounted to 76 parts by weight, corresponding to 85.5% of the theoretical amount.

EXAMPLE VI 1000 parts by weight of technical grade linoleic acid were heated with 200 parts by weight of magnesium oxide in the same manner and in the same equipment as disclosed in Example I. The flask was evacuated at a temperature of about 290° C. to a vacuum value of 4–5 mm. Hg and the mixture was thereafter heated for 10 minutes at a temperature of about 320° C. 475 parts by weight of ketone were obtained during the reaction from the reflux cooler. The characteristics of the ketone were as follows:

Acid number _____ 0.2
Saponification number _____ 0.2
Idine number _____ 196

On completion of the reaction, the glass flask was cooled and the residue, which could be stirred was twice extracted with 2000 parts by weight of acetone. The acetone was removed from the extract by distillation and 253 parts by weight of ketone were obtained having the following characteristics:

Acid number _____ 0.9
Saponification number _____ 3.5
Iodine number _____ 199

The total yield amounted to 728 parts by weight corresponding to 82% of the theoretical amount.

While specific embodiments of the invention have been shown and described in detail to illustrate the application of the inventive principles, it will be understood that the invention may be embodied otherwise without departing from such principles.

I claim:
1. A process of preparing ketones from $C_{18}$ alkenoic carboxylic acids, which comprises: heating $C_{18}$ alkenoic carboxylic acid in liquid state in the presence of magnesium oxide to form the magnesium soap of the acid and continuing the heating at reduced pressure and at a temperature of about between 300–325° C., the weight ratio of carboxylic acid to magnesium oxide being about between 100:15 to 100:30, whereby a ketone is formed, and separating the ketone.

2. A process as claimed in claim 1, wherein the heating is carried out at a pressure of less than 30 mm. Hg.

3. A process as claimed in claim 1, wherein the heating is carried out at a pressure of between 3 to 15 mm. Hg.

4. A process as claimed in claim 1, wherein said ketone is removed from the reaction mixture by extraction with acetone.

5. A process of preparing ketones from carboxylic acids which comprises: mixing a $C_{18}$ alkenoic acid in liquid state with a first amount of magnesium oxide at a temperature of below 100° C., thereafter heating the mixture thus obtained to a temperature between about 230° to 300° C., adding to the mixture a second amount of magnesium oxide at said temperature, whereby the magnesium soap of the acid is formed, and thereafter heating the mixture thus obtained to a temperature of about 300 to 325° C. at a pressure below 30 mm. Hg and for about 10–30 minutes, the sum of said first and second amounts of magnesium oxide having a value so that the weight ratio between said acid and the total amount of magnesium oxide is between about 100:15 to 100:30, whereby a ketone is formed.

6. A process as claimed in claim 1, wherein the heating at 300–325° C. is carried out for about between 10–30 minutes.

References Cited

UNITED STATES PATENTS 2,686,204  8/1954  Watson _____ 260—595

FOREIGN PATENTS 763,512  12/1956  Great Britain.

BERNARD HELFIN, *Acting Primary Examiner.*

L. ZITVER, *Examiner.*

M. JACOB, *Assistant Examiner.*